United States Patent
Krzesicki et al.

(10) Patent No.: US 6,814,683 B2
(45) Date of Patent: Nov. 9, 2004

(54) DIFFERENTIAL WITH BOLT FASTENER ASSEMBLY

(75) Inventors: Richard M. Krzesicki, Ann Arbor, MI (US); Robert C. Lawson, San Diego, CA (US); Norman Szalony, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/369,157

(22) Filed: Feb. 19, 2003

(65) Prior Publication Data

US 2004/0162178 A1 Aug. 19, 2004

(51) Int. Cl.⁷ ............................................. F16H 48/06
(52) U.S. Cl. .................................................... 475/230
(58) Field of Search ......................................... 475/230

(56) References Cited

U.S. PATENT DOCUMENTS

| | | |
|---|---|---|
| 671,719 A | 4/1901 | Coleman |
| 2,132,692 A | 10/1938 | Lawrence |
| 2,355,144 A | 8/1944 | Carlson |
| 2,865,219 A | 12/1958 | Allen |
| 3,216,282 A | 11/1965 | Randall |
| 3,261,230 A | 7/1966 | Rudnicki |
| 3,362,258 A | 1/1968 | Thornton |
| 3,438,282 A | 4/1969 | Thornton |
| 3,580,108 A | 5/1971 | Mieras |
| 3,906,812 A | 9/1975 | Kagata |
| 5,304,103 A | 4/1994 | Schlosser |
| 5,480,360 A | 1/1996 | Patzer et al. |
| 6,063,000 A | 5/2000 | Sugimoto |
| 6,190,281 B1 | 2/2001 | Oates |
| 6,210,299 B1 | 4/2001 | Yoshioka |

FOREIGN PATENT DOCUMENTS

| | | |
|---|---|---|
| GB | 2 354 563 A | 3/2001 |
| JP | 8-320060 | 12/1996 |

*Primary Examiner*—Dirk Wright
(74) *Attorney, Agent, or Firm*—Scott M. Confer

(57) ABSTRACT

A differential having a first side gear, a second side gear, and a fastener assembly to restrain the first and second side gears against axial movement. The first and second side gears each include an abutment face and a passage. The fastener assembly includes a bolt and a nut. The bolt has a shaft passing through the passages and a head operatively engaging one of the abutment faces of the side gears. The nut is coupled to the bolt and operatively engages the other abutment face.

The invention is also directed to an independent axle differential having a ring gear rotatable about an axis, a geared pinion coupled to rotate with and relative to the ring gear, the first and second side gears and fastener assembly discussed above, and first and second output shafts. The first and second output shafts are disposed in the cavity and coupled to rotate with the first and second side gears, respectively, and each have a shaft end located proximate to one of the bolt head and nut.

14 Claims, 11 Drawing Sheets

DIFFERENTIAL WITH BOLT FASTENER ASSEMBLY

BACKGROUND OF THE INVENTION

The present invention is generally directed to a torque transfer differential and, more particularly, to a differential having a fastener assembly for coupling side gears of the differential.

Differentials are commonly used in vehicle drive trains to communicate torque between elements. One such differential is a bevel differential having bevel gears mounted for rotation on shafts that rotate with a case. The bevel gears drivably mesh with output shafts such that the differential rotates the output shafts but permit the shafts to rotate relative to one another. In bevel differentials, it is important that the side gears be securely axially positioned to prevent backlash of the side gears relative to the bevel gears. Noise, vibration, and harshness resulting from backlash negatively impacts the driving environment and feel of the vehicle.

Conventional attempts to reduce backlash due to axial movement of the side gears or output shafts coupled thereto have focused on the use of a robust differential case that effectively surrounds and contains the side gears. However, this approach increases the weight and size of the differential thereby negatively affecting packaging concerns and fuel economy.

SUMMARY OF THE INVENTION

In view of the above, the present invention is directed to a differential having a first side gear, a second side gear, and a fastener assembly to restrain the first and second side gears against axial movement. The first and second side gears each include a cavity, an abutment face, and a passage. The fastener assembly includes a bolt and a nut. The bolt has a shaft passing through the passages and a head operatively engaging one of the abutment faces of the side gears. The nut is coupled to the bolt and operatively engages the other abutment face.

The invention is also directed to an independent axle differential having a ring gear rotatable about an axis, a geared pinion coupled to rotate with and relative to the ring gear, the first and second side gears and fastener assembly discussed above, and first and second output shafts. The first and second output shafts are disposed in the cavity and coupled to rotate with the first and second side gears, respectively, and each have a shaft end located proximate to one of the bolt head and nut.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
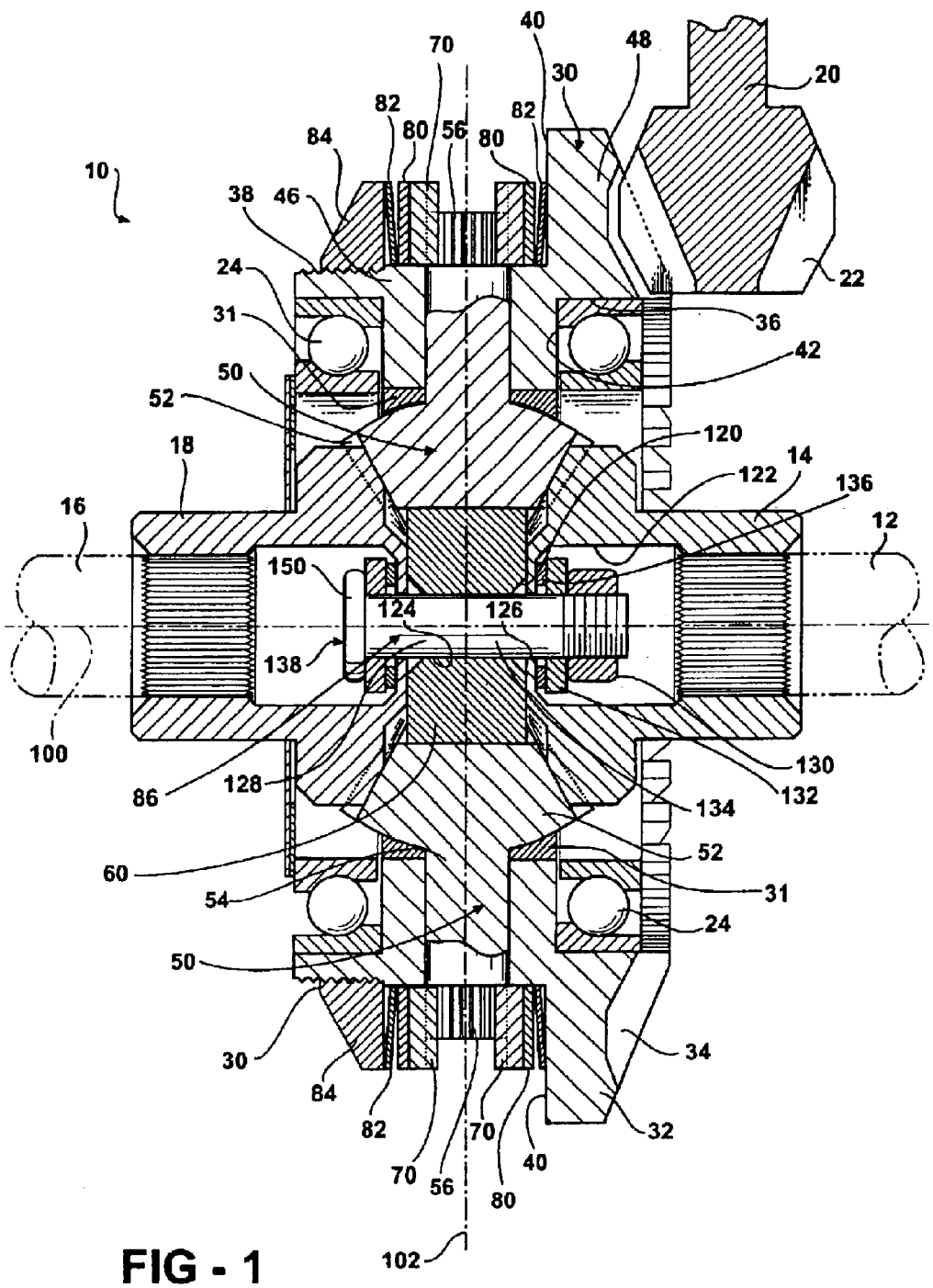
FIG. 1 is a sectional view of the differential.

A differential 10 constructed in accordance with the illustrated embodiment is shown in FIG. 1. The differential 10 is illustrated in all figures as being assembled into an independent axle configuration, but it should be readily apparent to one skilled in the art that the differential 10 may be used in other configurations, such as a tubular or beam axle. The differential 10 receives an input torque from a drive shaft 20, and transfers the input torque to a first axle shaft 12 and a second axle shaft 16. More specifically, the drive shaft 20 engages the ring gear 30 and rotates the ring gear 30 about a longitudinal axis 100. The differential case typically found in differentials is eliminated. Instead, the ring gear 30 encases and locates the pinions 50 as well as the first side gear 14 and second side gear 18. A fastener assembly 86 retains and secures the side gears 14 and 18 and pinions 50 within the ring gear 30. The elimination of the traditional differential case allows for a lightweight, low cost differential. A differential cover (not shown) may encase the differential 10 to protect the differential from environmental contamination.

A rotational slip coupling assembly 110 (FIG. 2) is configured to bias the pinions 50 against rotation until a specified torque is reached. More specifically, the rotational slip coupling assembly 110 includes a friction disc 80 movable in relation to rotation about the ring gear 30 and a clutch ring 70 movable in relation to rotation about the ring gear 30 as well as the pinions 50. The rotational slip coupling assembly 110 also includes a biasing element 82 to bias the clutch ring 70 and friction disc 80 into engaged positions so that the pinions 50 are biased from rotating.

The drive shaft 20 applies torque from the engine (not shown) to the differential 10. The drive shaft 20 is illustrated as a hypoid gear forged from steel and machined to the proper dimensions. A beveled gear 22 on the drive shaft 20 engages the ring gear 30. Of course, other drive shaft configurations may be used to transfer torque from the engine to the differential 100.

Figure 2:
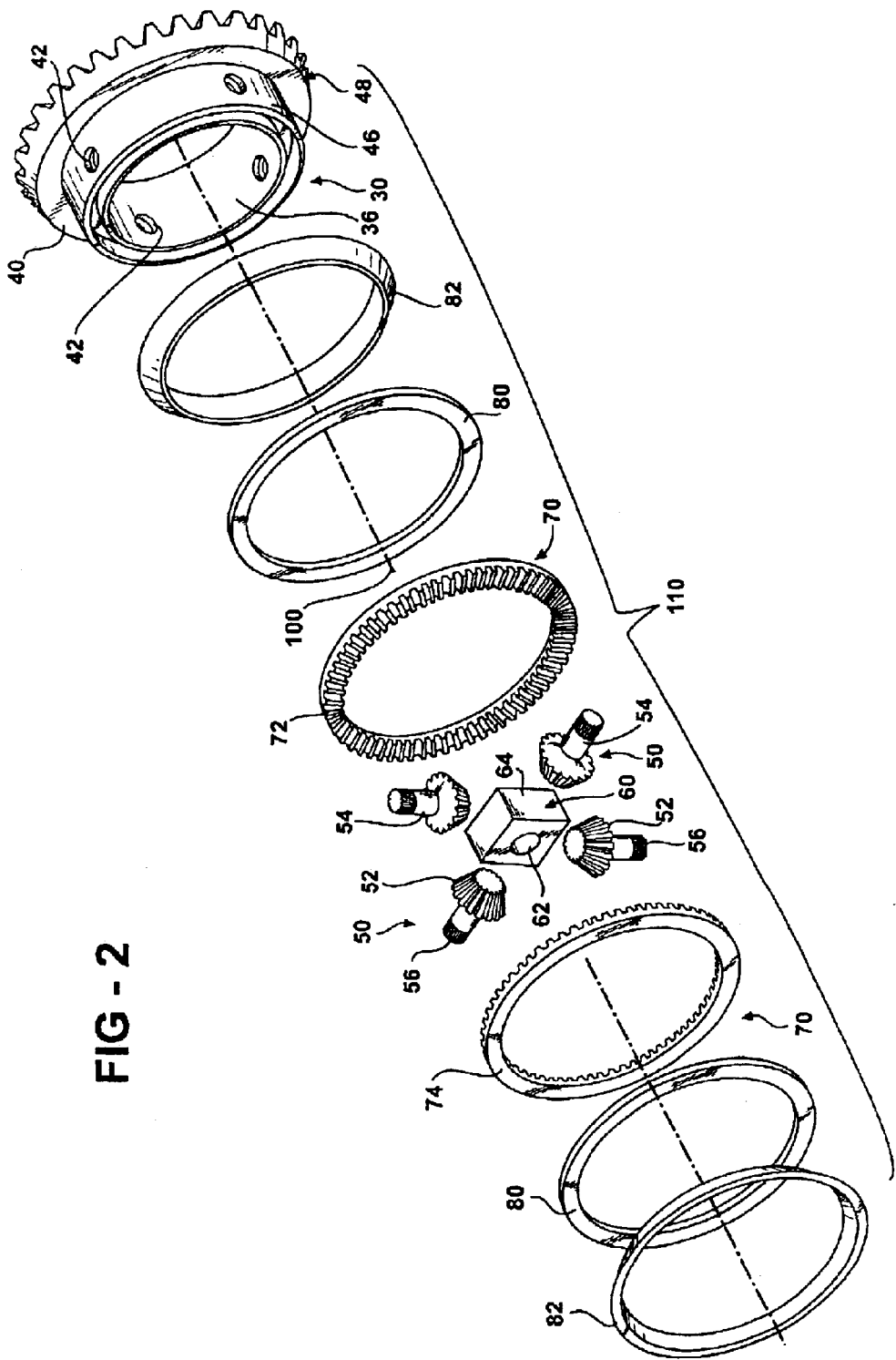
FIG. 2 is an exploded perspective view of the differential.

The ring gear 30 has an axial sleeve 46 and a radially extending hub 48. The sleeve 46 includes an inner radial surface 36, an outer radial surface 38, and a plurality of pinion holes 42 to rotatably receive the pinion shafts 54, with the number of holes 42 depending on the number of pinions 50. The number of pinions 50 may vary depending on the amount of torque being transferred from the engine to the wheels. The hub 48 includes a pressure plate surface 40 and a ring gear face 34. The ring gear face 34 may be formed in a variety of sizes, shapes, and configurations, as is well known to those skilled in the art and is shown in the illustrated embodiment as being beveled. Bearing assemblies 24 may support the ring gear 30 to ensure a smooth transition of the torque from the drive shaft to the axle shafts 12 and 16. The bearing assemblies 24 are illustrated in FIG. 2 as being located in a pocket formed in the axial sleeve 46 but other configurations may readily be used. The ring gear 30 is generally forged from steel and machined to the final specifications.

Figure 7:
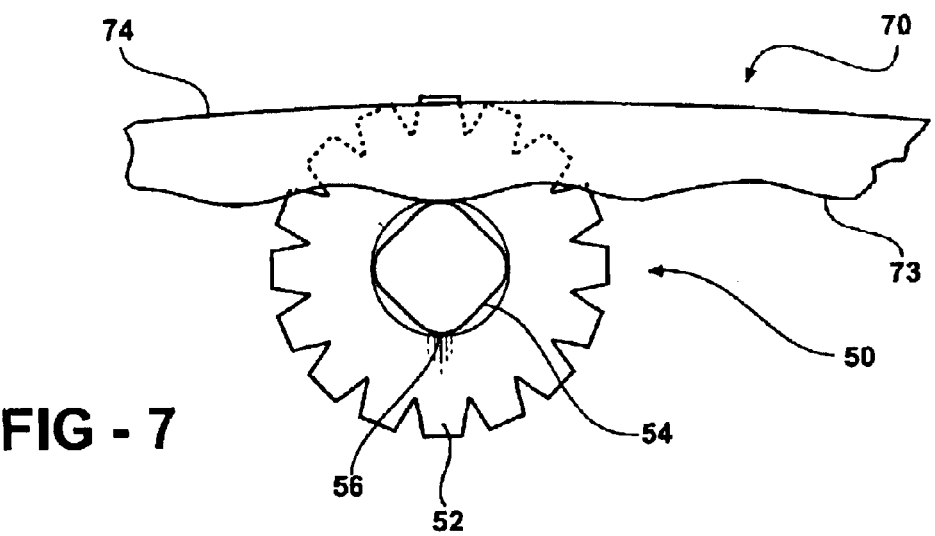
FIG. 7 is a top plan view of an alternative clutch ring having a cam profile engaged against a pinion.
Figure 8:
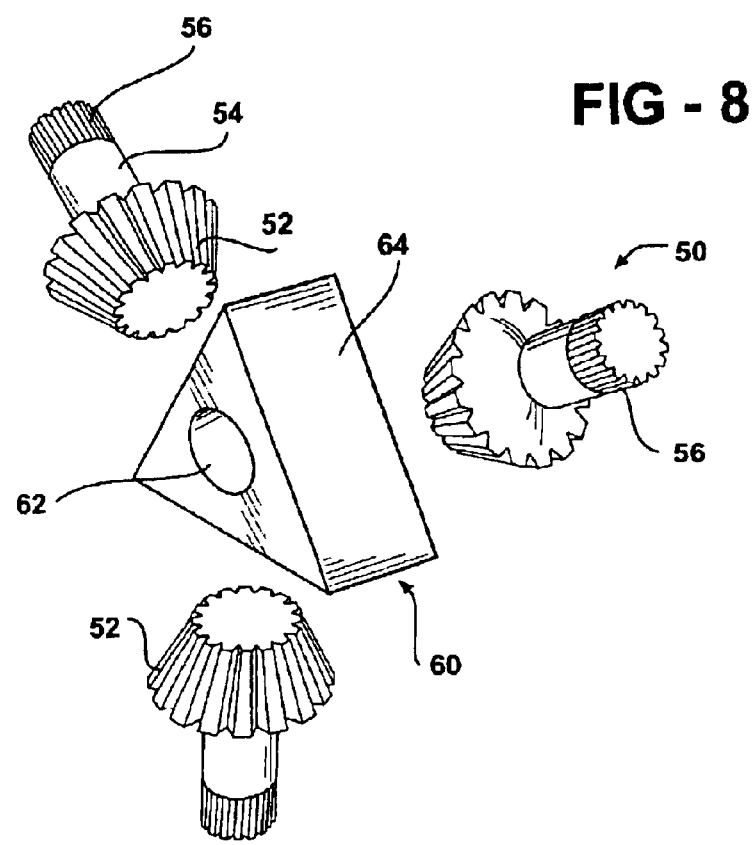
FIG. 8 is a perspective view of a three pinion arrangement.

The pinions 50 include a pinion gear 52, pinion shaft 54, and a mating surface 56 on the shaft 54. In the illustrated embodiments, the mating surface 56 is shown as a spur gear in FIGS. 1 and 3 and a cam profile in FIGS. 5 and 7. The size, shape, and number of pinions 50 may vary. The arrangement of the pinions 50 within the ring gear 30 is illustrated in FIGS. 1 and 2, although the configuration may vary so that two, three, four or more pinions 50 may be used. By way of example, FIG. 8 illustrates a three pinion arrangement. As the wheel speeds differ, such as turning a corner, the pinions 50 rotate about a pinion axis 102 within the pinion holes 42. Bearings (not shown) may be included in these pinion holes 42 to allow smooth and consistent rotation of the pinions 50 about the pinion axis 102. The pinions 50 are formed out of steel and preferably forged. It should be obvious to one skilled in the art that even though in the illustrated embodiment the pinions 50 are shown passing through the ring gear 30, the differential 10 may be formed so that as few as one pinion passes through the ring gear 30 while the others are arranged within the ring gear 30 and may be formed without an elongated shaft 54 and the mating surface 56.

Figure 4:
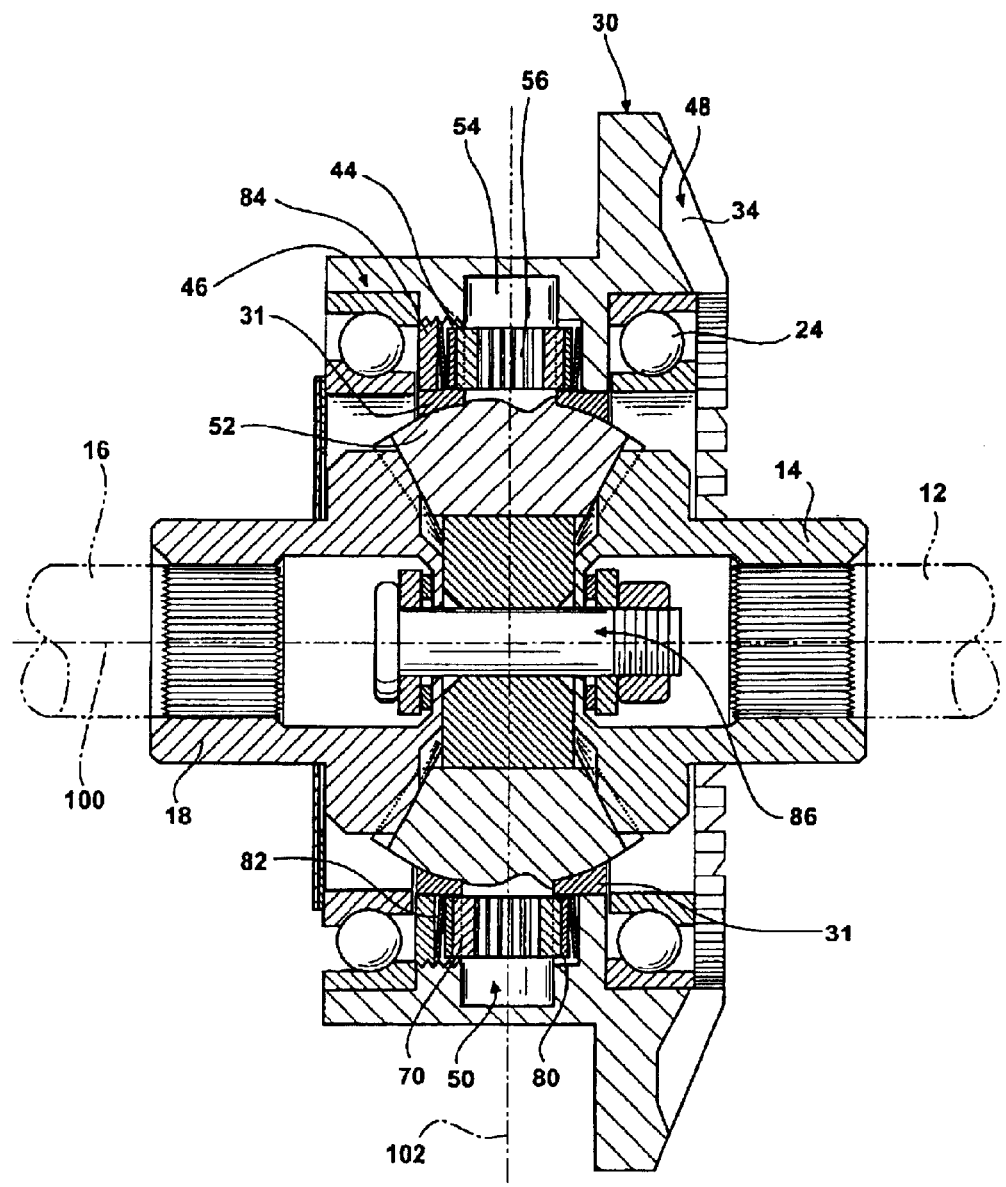
FIG. 4 is a sectional view of a first alternative embodiment.
Figure 6:
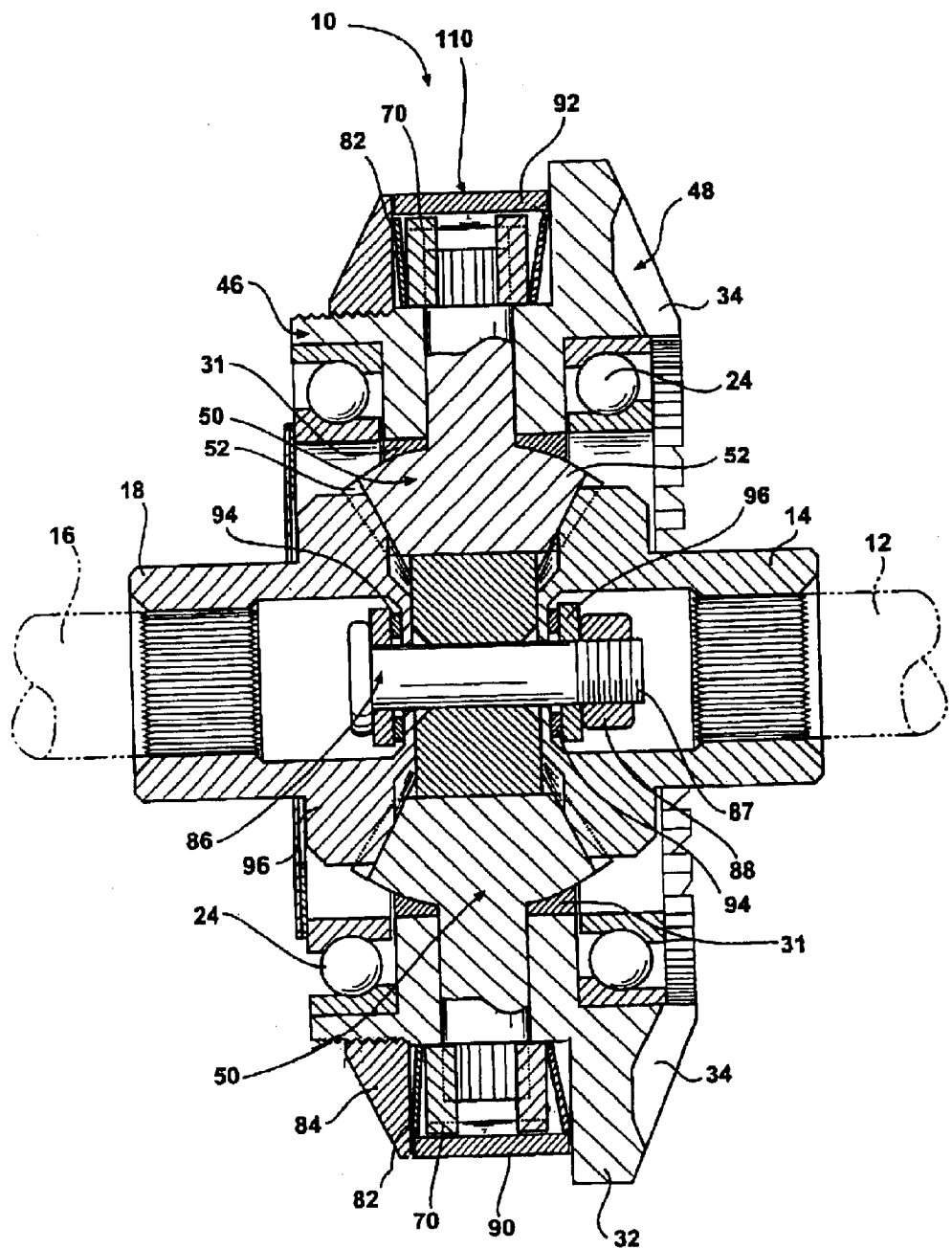
FIG. 6 is a sectional view of the second alternative embodiment.

A spacer block 60 and a pinion spacer 31 cooperate to maintain the axial position of the pinions 50. The pinions 50 are engaged against the ring gear 30 (not shown) or a spacer 31 and the spacer block 60 to prevent the pinions from moving along the pinion axis 102. As shown in FIG. 1, the spacer block 60 includes a spacer hole 62 and a pinion surface 64. The size and shape of the spacer block 60 may vary depending on the number of pinions 50. For example, a rectangular or square block is used for two pinions, a triangular block for three pinions as illustrated in FIG. 8, and a square block for four pinions, as illustrated in FIG. 2. The spacer block 60 is preferably formed from steel through a powdered metal process, but also may be formed by machining or other suitable processes known in the art. The pinions 50 are supported by the pinion support surfaces 64. It is noted that in the illustrated embodiment, the side gears 14 and 18 are axially coupled by a fastener assembly 86, the structure, operation, and benefits of which are discussed in detail below. However, it should be understood that the differential of the present invention may be used with other mechanisms for retaining the side gears. As illustrated in FIGS. 1, 4, and 6, the fastener assembly 86 passes through the spacer hole 62 on the spacer block 60. More specifically, the fastener assembly 86 interconnects the side gears 14 and 18 to restrain the gears against axial loads and allow for easier assembly than if the axle shafts 16 and 18 were directly interlocked.

The pinions 50 rotationally engage the first side gear 14 and second side gear 18 attached to the first axle shaft 12 and the second axle shaft 16, respectively. The side gears 14 and 18 may be formed as an integral part of the axle shafts 12 and 16, or may be attached to axle shafts 12 and 16 by a variety of methods known in the art, one such method being the splined connection illustrated in FIGS. 1 and 4. The side gears 14 and 18 are also preferably, though not necessarily, formed from steel by a forging process.

As with conventional pinion differentials, rotation of the pinions 50 allow the side gears 14 and 18 to rotate relative to one another so that one wheel may turn faster than the opposing wheel. However, in the present invention, the rotational slip coupling assembly 110 creates an initial torque bias inhibiting rotation of the pinions 50 so that the torque applied to the ring gear 30 causes the side gears 14 and 18 to rotate at the same speed until the initial torque bias is overcome. Accordingly, by initially restraining the pinions against rotation, the assembly 110 prevents immediate relative rotation between the shafts 12 and 16 when one of the wheels is on a low traction surface such as snow and ice.

Figure 3:
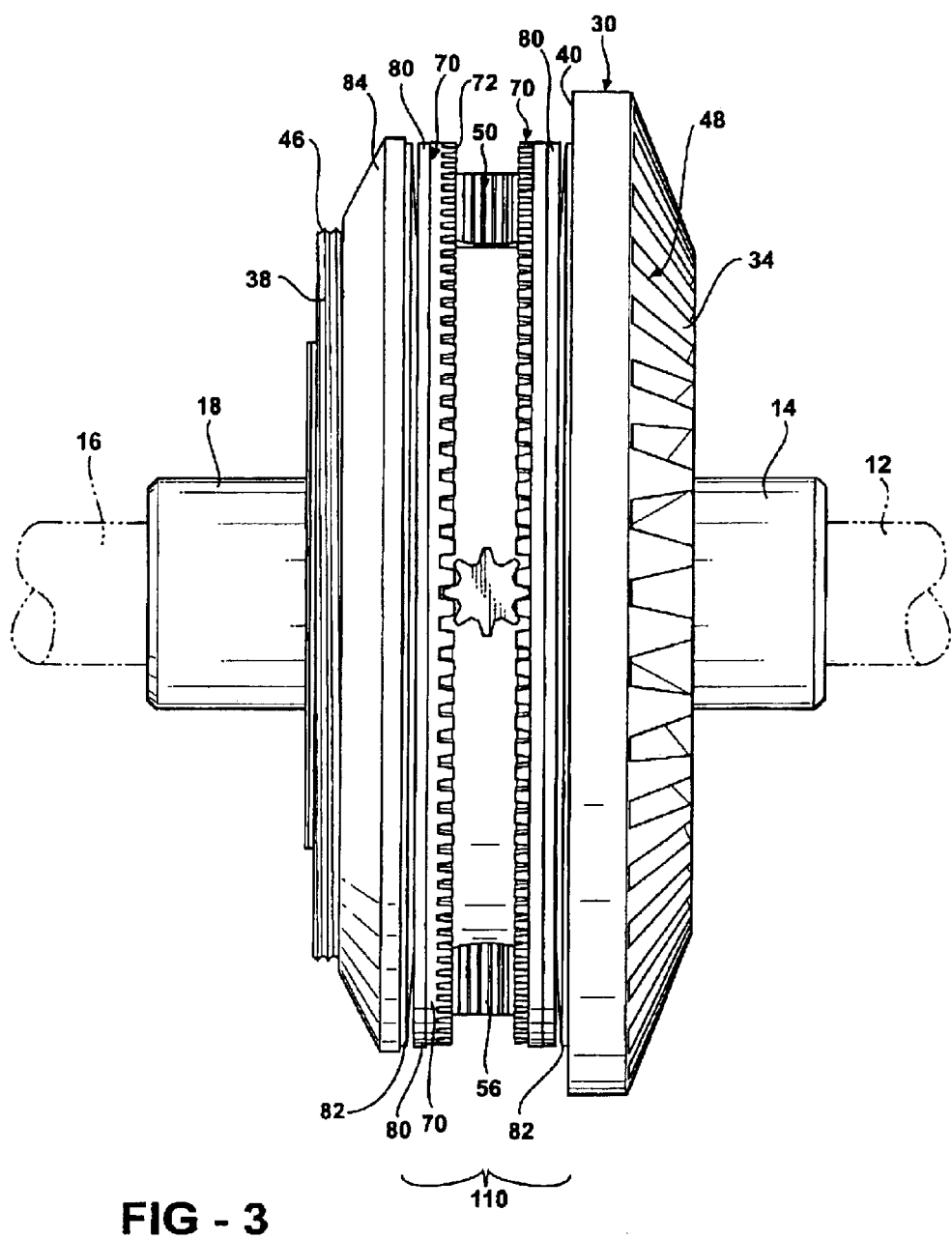
FIG. 3 is a top elevational view of the differential.

As is most clearly illustrated in FIG. 2, the rotational slip coupling assembly 110 includes clutch rings 70, friction plates 80, a biasing mechanism 82, and a retaining ring 84. The clutch rings 70 include a gear face 72 and a friction face 74. The clutch rings 70 are sized so that they pass freely over the outer radial surface 38 of the ring gear 30. The gear face 72 of the clutch rings 70 engages the mating surface 56 on the pinions 50 so that the clutch rings 70 rotate with the pinions 50. As illustrated in FIGS. 2 and 3, the differential 10 includes two clutch rings 70 on each side of the pinions 50, although it should be readily apparent to one skilled in the art that the differential 10 may be assembled with only one clutch ring 70. The clutch rings 70 are preferably formed from steel using a powered metal process, but other materials and techniques may be used.

The friction plates 80 are sized to be disposed over the outer radial surface 38 of the ring gear 30. The friction plates 80 engage the friction face 74 of the clutch rings 70 to bias the side gears 14 and 18 from rotating relative to one another. The friction plate 80 biases the side gears 14 and 18 by frictionally engaging the clutch ring 70 so that in order for the clutch ring 70 to rotate with the pinions and relative to the friction plate 80, the friction coefficient between the friction plate and the clutch ring must be overcome. The type of materials used to form the friction plate 80 may vary depending on the desired torque biasing and if the differential 10 is designed for a wet or dry clutch assembly. Acceptable materials for the friction plates 80 include, but are not limited to, paper, carbon fiber, steel, or sintered metal. The number of friction plates 80 will vary depending on the desired torque bias and the application. Although not illustrated, the friction plates 80 may be restrained from rotational movement around the ring gear axis 100, for example the ringer gear may include a slot over which the friction plate slides. Such restraint of the friction plates 80 helps to ensure that the friction plates are frictionally coupled to the clutch rings 70 and not the biasing mechanism 82.

The torque bias may also vary depending on the amount of pressure applied to the friction plates 80 by a biasing mechanism 82. In the illustrated embodiment, the biasing mechanism 82 is a bevel washer although coil springs, wave washers, and other biasing mechanisms may easily be used. The biasing mechanism 82 may be chosen based on the desired biasing force, durability, and other considerations readily apparent to those skilled in the art.

A retaining ring 84 (FIG. 1) is shown to lock the biasing mechanism 82, friction plates 80, and clutch rings 70 in place. The position of the retaining ring 84 affects the initial biasing force applied to the friction plates 80 and therefore the pinions 50. More particularly, as the retaining ring 84 is positioned closer to the hub 48, the biasing mechanism 82 is further compressed and exerts a greater force on the friction plates 80. As shown in FIG. 1, the retaining ring 84 is threaded onto the ring gear 30 into its desired location. A thread locker or other mechanical means may be used to ensure the retaining ring 84 stays secured in its desired location on the ring gear 30. The retaining ring 84 may also be slid into place and locked by a snap ring, staking, pins, or the like. As illustrated in FIGS. 1 and 4, a retaining ring 84 may be used on only one side of the pinions 50 because the pressure face 40 of the ring gear 30 acts as a second retaining ring. Although not illustrated, an extra retaining ring may be added between ring gear 30 and the biasing mechanism 82. This extra retaining ring may help adjust the bias force or adjust for manufacturing tolerances.

As illustrated in FIG. 4, in a first alternative embodiment, the rotational slip coupling assembly 110 (including the clutch ring 70, friction plates 80, and biasing mechanism 82) may be moved inside of the ring gear 30. The ring gear 30 may be formed with a slightly larger diameter to accommodate the placement of components within the ring gear 30. The clutch ring 70, friction plates 80, and biasing mechanism 82 may also be sized to fit within the ring gear 30. The pinions 50 have the mating surface 56 moved closer to the pinion gear 52 and a shorter shaft 54. As seen in FIG. 4, the pinion shaft 54 may pass above the mating surface 56 into the pockets 44 in the ring gear 30, replacing the pinion holes 42.

Figure 5:
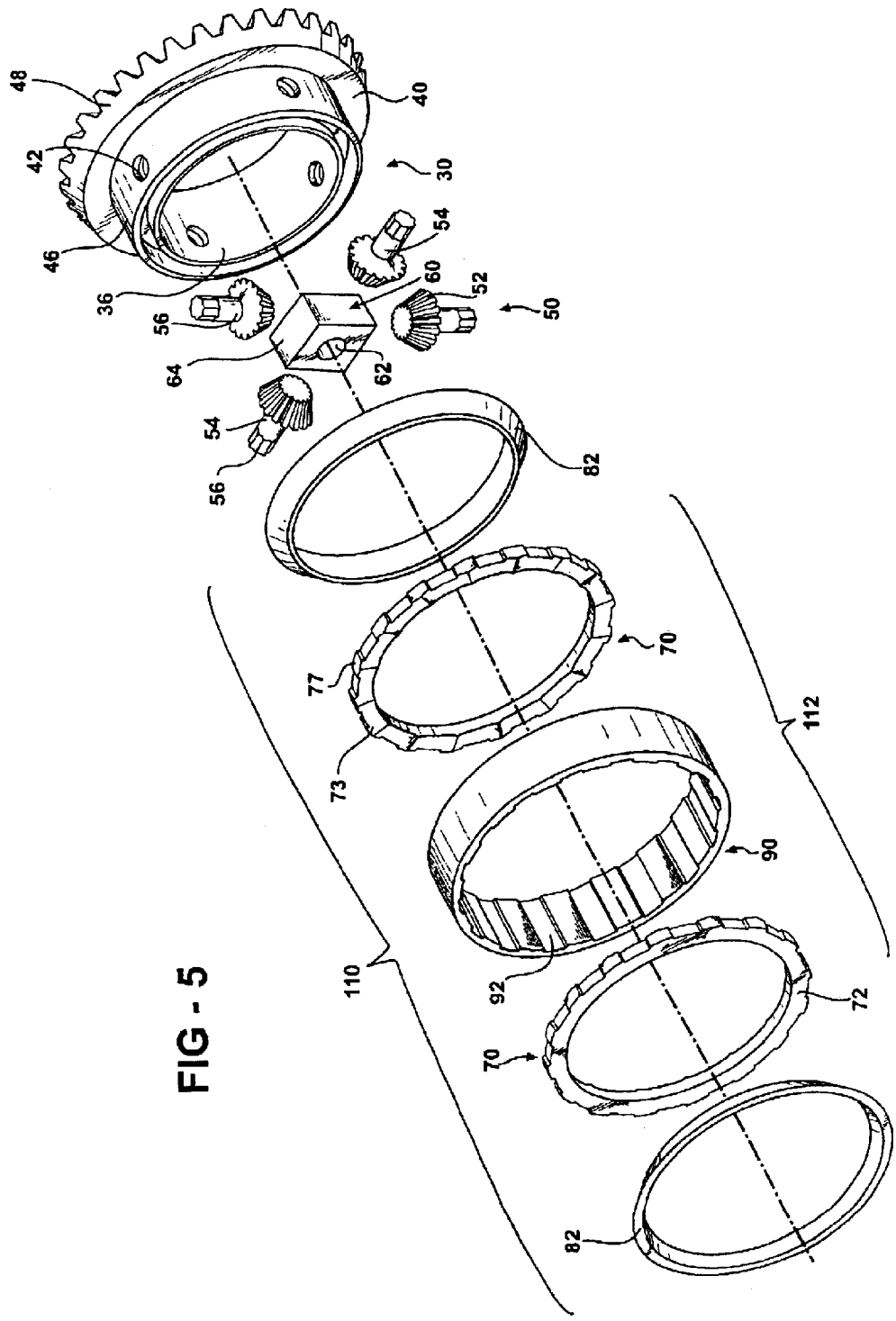
FIG. 5 is an exploded perspective view of a second alternative embodiment.

A second alternative embodiment is illustrated in FIGS. 5 and 6 where the differential 10 is assembled without friction plates 80. The rotational slip coupling assembly includes at least two mechanically interlocking elements 112, one movable in relation to rotation about the ring gear 30 and the other movable in relation to rotation about the ring gear 30 as well as the pinions 50. The pinions 50 and clutch rings 70 are slightly modified as described below.

The pinions 50 are formed to have a cam profile or may even have a square profile on the mating surface 56, as shown in FIG. 5. The gear face 72 of the clutch ring 70 is also formed with a cam profile 73 as shown in FIGS. 5 and 7. The illustrated cam profile 73 is only a rough illustration of the potential profiles. For example, the cam profile may extend from a flat surface to define ridges and valleys as shown in FIG. 5. In the preferred embodiment, the cam profile 73 is moderate to assist the pinion 50 in initiating rotation as compared to a flat surface, although it should readily be apparent to one skilled in the art that bias force provided by the biasing mechanism 82 also affects the initiation of rotation of the pinion 50. Therefore, if a flat cam profile is used, the bias force may be weakened as needed. The pinion mating surface 56 engages the clutch ring cam profile 73. The biasing mechanism 82 presses the clutch ring 70 against the pinions 50 to provide torque bias. The coupling 90 is placed over the clutch ring 70 and includes at least one slot 92 that engages one pin 77 on the clutch ring 70. The coupling prevents the clutch ring 70 from rotating, so that for the side gears 14 and 18 to rotate relative to each other, the pinions 50 must push the clutch ring 70 apart to rotate. The torque biasing is provided by the biasing mechanism 82 and as the pinions 50 rotate, they must push the clutch rings 70 apart until the pinion 50 snaps to a new position between the mating surface 56 and the matching cam profile 73 of the clutch ring 70. The retaining ring 84 may also be sized to retain the coupling 90 in place over the clutch ring 70. Of course it should be readily apparent to one skilled in the art that the above embodiment may be made with only one clutch ring 70 and one biasing mechanism 82.

Although not illustrated, it should also be readily apparent that the second alternative embodiment may also be formed with a clutch ring 70 and biasing mechanism 82 being located within the ring gear 30 similar to the first alternative embodiment. The coupling 90 may then be eliminated if the coupling slots 92 are integrally formed on the inner radial surface 36 of the ring gear 30.

Figure 9:
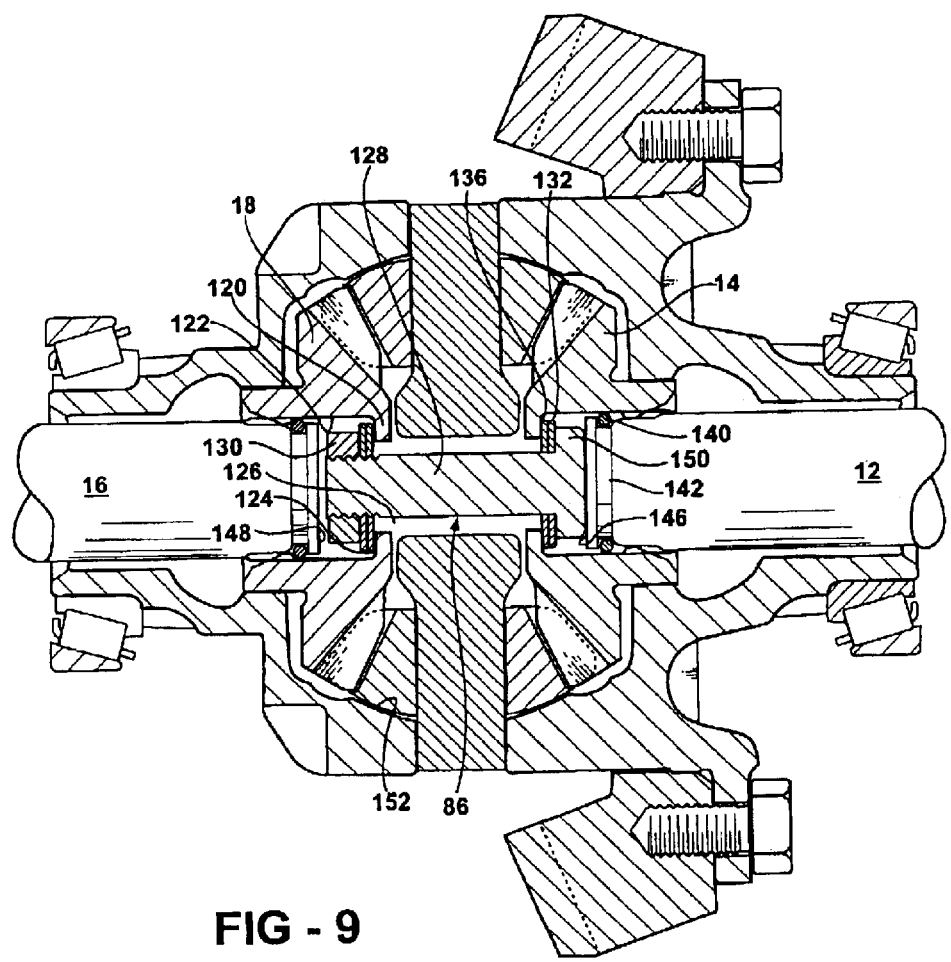
FIG. 9 is a sectional view of a differential illustrating the fastener assembly feature of the present invention.
Figure 10:
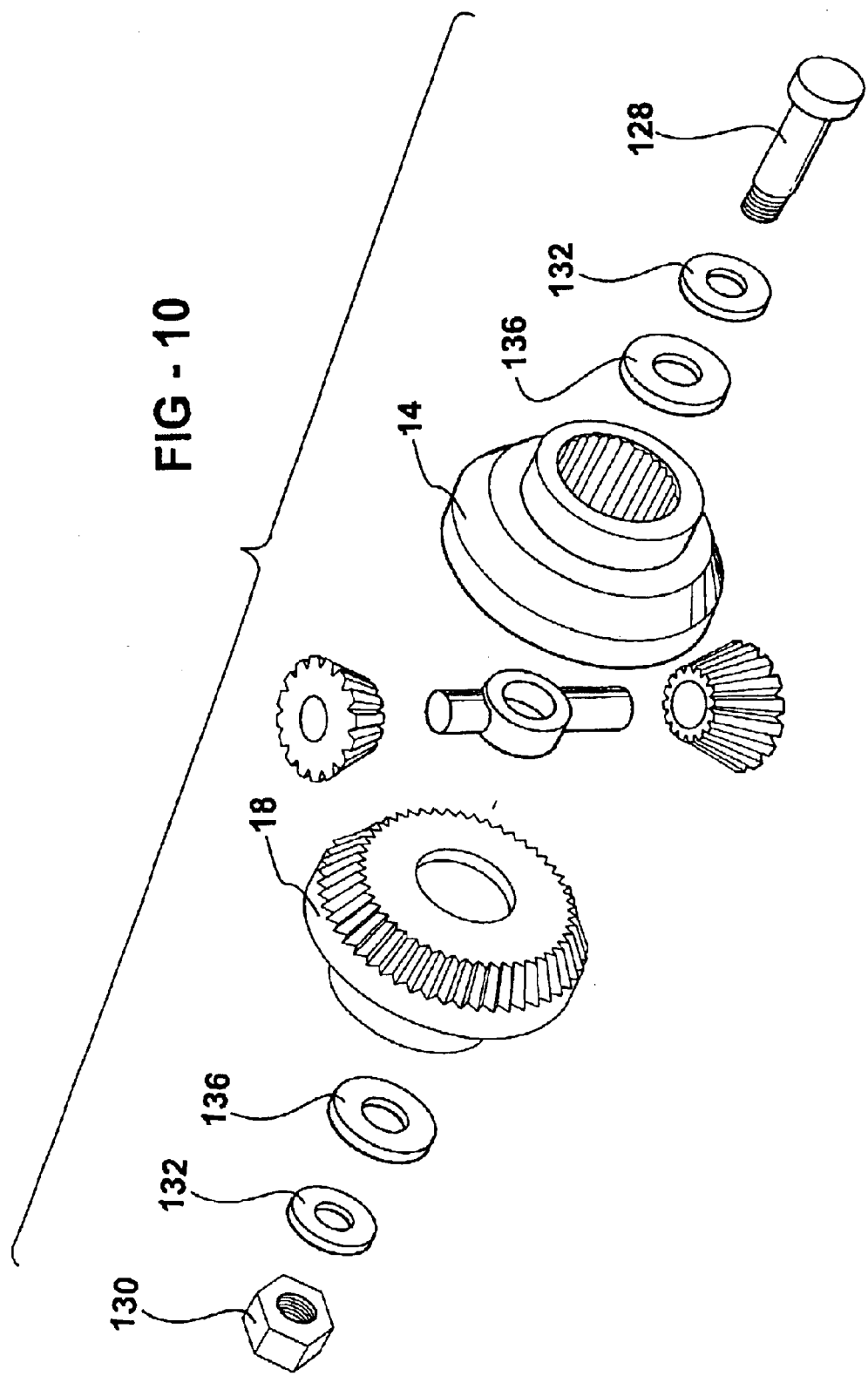
FIG. 10 is an exploded perspective of the differential with fastener assembly.

As is generally discussed above, the first and second side gears 14 and 18 are axially coupled to one another by a fastener assembly 86. The use of a fastener assembly 86, including each of the embodiments disclosed herein and other modifications apparent to those skilled in the art, represents an additional feature of the differential 10 that has application in combination with as well as beyond the differentials discussed above. For example, the fastener 86 may be used in a bevel differential having a traditional differential pinion 88 as shown in FIGS. 9 and 10.

The fastener 86 couples the side gears 14 and 18 and restrains the side gears against axial movement, such as from backlash or thrust loading, in a manner that is less complex and costly than coupling techniques commonly used in the art. Moreover, the fastener arrangement described herein may be used in an independent suspension axle assembly that does not include a differential case. In conventional independent axle designs, the external ring gear is meshed with the drive gear (e.g., gear 22 in FIG. 1) and fixed to rotate with a differential case. The differential case houses the bevel pinions 50 and gears 14 and 18 and axially restrains the side gears 14 and 18. By otherwise restraining the side gears, the fastener assembly of the present invention eliminates the need for a differential case. The fastener assembly 86 also provides side gear retention that alleviates or minimizes driveline clunk. In general, the fastener assembly meshes the side gears and pinions to a desirable preload torque to eliminate gear backlash thereby mitigating driveline clunk. The fastener assembly also provides opportunities to reduce the mass and inertia of neighboring structural components. The gear mesh loads are absorbed within the differential gearing without transmitting it to neighboring structural elements thereby reducing the strength requirements of other structural components. As such, the present invention reduces manufacturing costs, provides space savings, and reduces the overall weight of the differential while also simplifying the assembly process.

Notwithstanding the additional advantages provided by the use of the fastener assembly 86, it should be appreciated that the limited slip differential 10 described above may be used in differentials that do not include the illustrated fastener assembly. Numerous differential case configurations and other techniques may be used to laterally restrain the side gears in lieu of the illustrated fastener assembly. For example, the rotational slip coupling assembly 110 may be used with a traditional differential case having a ring gear 31 attached to the outside of the differential case. The present application is generally directed to a differential having the fastener assembly 86 as described below. A co-pending application entitled "Limited Slip Differential" filed on the same date as the present application is generally directed to the differential assembly having the rotational slip coupling assembly described above either with or without the fastener assembly 86.

One embodiment of the fastener assembly 86 is illustrated in FIGS. 1, 4, and 6. As is shown in FIG. 1, the side gears 14 and 18 each include flanges 120 extending radially inward from a cavity 122 to define an abutment surface 124 and a fastener passage 126 alignable with the spacer hole 62. The fastener assembly 86 includes a bolt 128, nut 130, and a hardened thrust washer 132 located on the bolt shaft 134. The fastener assembly 86 is also shown to include a roller bearing 136 to facilitate low friction relative rotation between the bolt and nut and the side gears. The bearing 136 and washer 132 mate with the flange 120 and the assembly is secured through the use of the bolt 128 and nut 130.

A variety of mechanisms may be used to rotationally couple the shafts 12 and 16 to the side gears 14 and 18. For example, as shown in FIG. 9, clips 140 may be snapped into grooves 142 in the axle shafts to axially restrain the axle shafts 12 and 16 relative to the side gears and prevent the axle shafts from sliding out of the side gear and axle assembly. The grooves 142 in the axle shafts are preferably positioned to place the ends 146 and 148 of the axle shafts in a minimum clearance relationship determined by the manufacturing process used to create the components. The proximity of the shaft ends to the bolt head and nut prevents the bolted attachment from loosening such as by the nut walking off the threaded end of the bolt. For completeness, it is noted that suitable connectors other than the clips 140, such as lock pins and the like, may be used to secure the shafts to the side gears.

As is shown in FIG. 9, the ring gear 30 may include a spherical inner surface 152 that further axially as well as radially constrains the bevel differential pinion gears. A second nut may also be included in the fastener assembly to enhance the axial coupling and to prevent the first nut from walking off the end of the bolt. If used, it is anticipated that the first nut would be tightened on the bolt to take out any backlash in the differential and the second nut would lock the first nut in its zero backlash position. The two nuts would be of different hex sizes to facilitate wrench tightening. Alternatively, cylindrical nuts having holes for spanner tool tightening may be used. Again, in this instance the two nuts would be individually tightened during assembly to minimize backlash.

Alternative embodiments of the fastener assembly 86 are shown in FIGS. 9 and 11–13 for use in a differential that does not include the rotational slip coupling assembly 110 described above with reference to FIGS. 1–8. Thus, those skilled in the art will appreciate that the fastener assembly 86 and the rotational slip coupling assembly may be used independent of one another or in combination.

Figure 11:
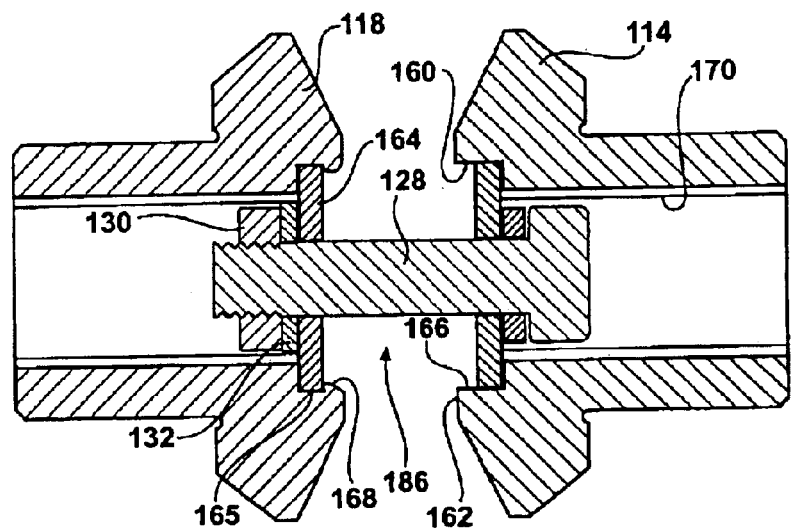
FIG. 11 is a section view of a differential similar to that shown in FIG. 8 and illustrating alternative embodiment of the fastener assembly feature of the present invention.

As shown in FIG. 11, the fastener assembly 186 again includes a bolt 128, nut 130, and thrust washers 132. Roller bearings could again be included to reduce friction forces generated by relative rotation between the bolt/nut and side gears. In this embodiment, the side gears 114 and 118 have an enlarged diameter pocket 160 extending axially from faces 162 to receive additional thrust washers 164 each having a serrated outer surface 165. During assembly, the pocket 160 is machined or otherwise provided in the side gears, the thrust washers 164 are press fit into the pockets, and the outer side gear corner 166 (shown on right side gear 114) is roll formed, orbit formed, or otherwise deformed as shown at 168 (shown on left side gear 118) to retain each thrust washer inside the side gear pocket. This embodiment of the fastener assembly has the additional benefit of allowing for manufacturing of the side gear spline 170 with a through-broach as the side gears do not have integral radial flanges.

Figure 12:
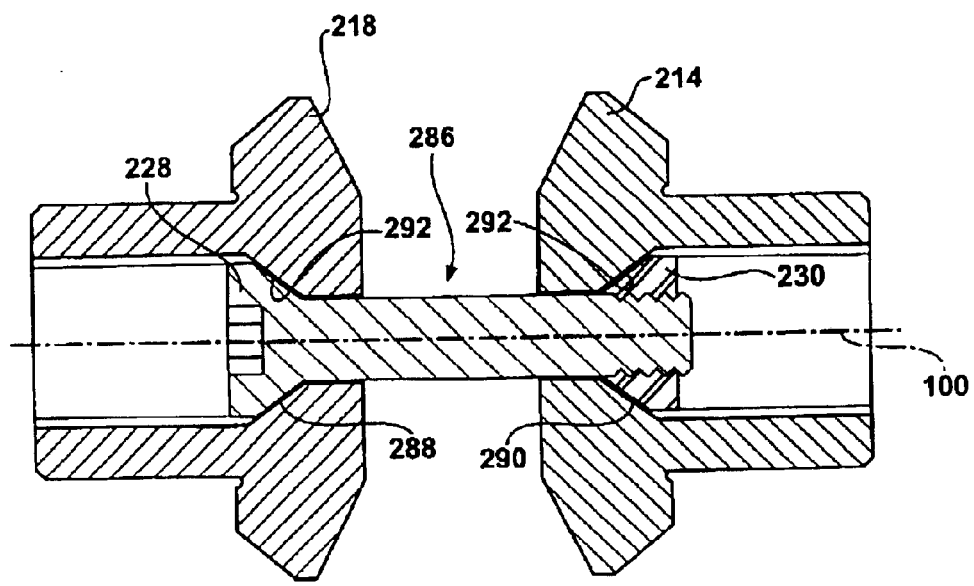
FIG. 12 is a partial sectional view of a differential of the present invention illustrating yet further alternative embodiments of the fastener assembly feature.

With reference to FIG. 12, the fastener assembly 286 includes a bolt head 228, nut 230 and side gears 214 and 218 each with tapered engagement surfaces 288, 290, and 292, respectively. These tapered surfaces enhance the alignment of the bolt and nut relative to the side gears 214 and 218 while further providing a self-locking feature to prevent relative rotation between the bolt bead/nut and the side gears. More particularly, thrust loading from the side gears is transferred to the tapered engagement surfaces. Frictional forces acting between the tapered engagement surfaces (the magnitude of which are dependent upon the thrust loading, the angle of the taper, and the friction coefficient along the tapered engagement surfaces) inhibit relative rotation between the bolt head/nut and the side gears thereby acting as a self locking mechanical torque biasing feature for the axle assembly. With this arrangement, relative rotation between the side gears 214 and 218, and therefore the shafts 12 and 16, are prevented until the torque exceeds the frictional forces along the tapered surfaces. For completeness it is noted that while the angle of the taper and the friction coefficient may vary for any particular application, it is contemplated that the taper will be in the range of about 5 to 7 degrees relative to the rotational axis 100 and that the friction coefficient will be on the order of 0.08 to 0.11. This non-limiting example has been found to be useful for very low cost mechanical-low-torque bias applications.

Figure 13:
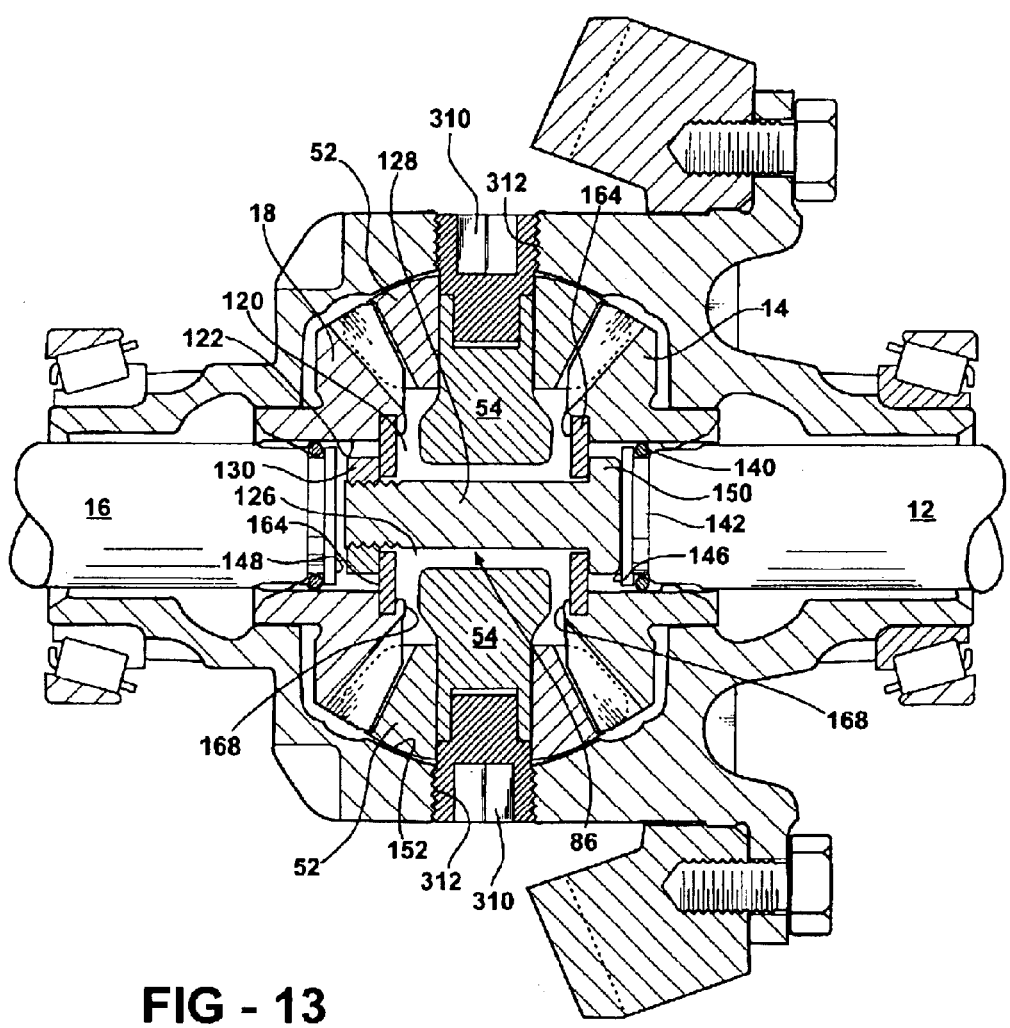
FIG. 13 is a section view illustrating another embodiment of the differential and fastener assembly.

FIG. 13 illustrates a further modification to the differential 10 which facilitates use of the invention in carryover architectures and eases assembly. In this embodiment, the differential pinion shafts 54 fall short of the differential housing and threaded and piloted plugs 310 are disposed in cooperatively threaded bores 312 to secure the differential pinion 50 to the ring gear 30.

With the multiple embodiments disclosed above, those skilled in the art will appreciate that numerous nut and bolt configurations may be used with the present invention. Moreover, different thrust washer and bearing configurations may also be used. For example, a needle roller thrust bearing assembly may be used in place of the intermediary washer associated with each side gear to interface with the orbitally formed staked thrust washer. Moreover, thrust washers may be coated, such as with a nickel or chrome coating, to improve wear and lubricity.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A differential comprising:
   a first side gear having a cavity, a first flange defining an abutment face, and a passage communicating with said cavity;
   a second side gear having a cavity, a second flange defining an abutment face, and a passage communicating with said cavity;
   a fastener assembly including a bolt, a nut, a first thrust washer and a second thrust washer, said bolt having a shaft passing through said passages in said first and second side gears and a head operatively engaging one of said abutment faces, said nut operatively engaging the other of the abutment faces to restrain said first and second side gears against relative axial movement; and
   wherein said first thrust washer is disposed between said bolt head and said one of the abutment faces and said second thrust washer is disposed between said nut and said other of the abutment faces.

2. The differential of claim 1 wherein said fastener assembly further includes a bearing disposed between said first thrust washer and said one of the abutment faces and a second bearing disposed between said second thrust washer and said other of the abutment faces.

3. The differential of claim 1 wherein said first flange is integral with said first side gear.

4. The differential of claim 1 wherein said first side gear includes an inner face and a pocket recessed from said inner face, wherein said first thrust washer is disposed in said pocket to form said first flange including said abutment face and passage, and wherein said first side gear has a roll formed edge restraining said first thrust washer against axial movement.

5. The differential of claim 1 further including a spacer block disposed between said first and second side gears, said spacer block having a hole, said bolt shaft passing through said hole.

6. A differential comprising:
   a first side gear having a cavity, a first flange defining an abutment face, and a passage communicating with said cavity;
   a second side gear having a cavity, a second flange defining an abutment face, and a passage communicating with said cavity;
   a fastener assembly including a bolt and a nut, said bolt having a shaft passing through said passages in said first and second side gears and a head operatively engaging one of said abutment faces, said nut operatively engaging the other of the abutment faces to restrain said first and second side gears against relative axial movement; and
   wherein said abutment faces, bolt head, and nut have angled surfaces to create a torque bias inhibiting rotation of said first and second side gears relative to said bolt head and nut.

7. The differential of claim 6 further including a spacer block disposed between said first and second side gears, said spacer block having a hole, said bolt shaft passing through said hole.

8. A differential comprising:
   a first side gear having a cavity, a first flange defining an abutment face, and a passage communicating with said cavity;
   a second side gear having a cavity, a second flange defining an abutment face, and a passage communicating with said cavity;
   a fastener assembly including a bolt and a nut, said bolt having a shaft passing through said passages in said first and second side gears and a head operatively engaging one of said abutment faces, said nut operatively engaging the other of the abutment faces to restrain said first and second side gears against relative axial movement; and
   a first output shaft disposed in said cavity of said first side gear, coupled to rotate with said first side gear and having an end located proximate one of said bolt head and nut and a second output shaft disposed in said cavity of said second side gear, coupled to rotate with said second side gear, and having an end located proximate the other of said bolt head and nut.

9. An independent axle differential comprising:
   a ring gear rotatable about an axis;
   a pinion coupled to rotate with and relative to said ring gear, said pinion having a gear;
   a first side gear meshed with said pinion gear, said first side gear having a cavity, a first flange defining an abutment face, and a passage communicating with said cavity;
   a second side gear meshed with said pinion gear, said second side gear having a cavity, a second flange defining an abutment face, and a passage communicating with said cavity;
   a fastener assembly including a bolt and a nut, said bolt having a shaft passing through said passages in said first and second side gears and a head operatively engaging one of said abutment faces, said nut operatively engaging the other of the abutment faces to axially restrain said first and second side gears against relative axial movement;
   a first output shaft disposed in said cavity of said first side gear, coupled to rotate with said first side gear and having an end located proximate one of said bolt head and nut;
   a second output shaft disposed in said cavity of said second side gear, coupled to rotate with said second side gear, and having an end located proximate the other of said bolt head and nut; and
   wherein said first side gear includes an inner face and a pocket recessed from said inner face, wherein said fastener assembly further includes a washer disposed in said pocket to form said first flange including said abutment face and passage, and wherein said first side gear has a roll formed edge restraining said washer against axial movement.

10. The axle differential of claim 9 wherein said first flange is integral with said first side gear.

11. The axle differential of claim 9 further including a spacer block disposed between said first and second side gears, said spacer block having a hole, said bolt shaft passing through said hole.

12. The independent axle differential of claim 9 further including plugs threadably coupling the pinion to the ring gear.

13. An independent axle differential comprising:
   a ring gear rotatable about an axis;
   a pinion coupled to rotate with and relative to said ring gear, said pinion having a gear;
   a first side gear meshed with said pinion gear, said first side gear having a cavity, a first flange defining an abutment face, and a passage communicating with said cavity;
   a second side gear meshed with said pinion gear, said second side gear having a cavity, a second flange defining an abutment face, and a passage communicating with said cavity;
   a fastener assembly including a bolt and a nut, said bolt having a shaft passing through said passages in said first and second side gears and a head operatively engaging one of said abutment faces, said nut operatively engaging the other of the abutment faces to axially restrain said first and second side gears against relative axial movement;
   a first output shaft disposed in said cavity of said first side gear, coupled to rotate with said first side gear and having an end located proximate one of said bolt head and nut;
   a second output shaft disposed in said cavity of said second side gear, coupled to rotate with said second side gear, and having an end located proximate the other of said bolt head and nut; and
   wherein said abutment faces, bolt head, and nut have angled surfaces to create a torque bias inhibiting rotation of said first and second side gears relative to said bolt head and nut.

14. The axle differential of claim 13 further including a spacer block disposed between said first and second side gears, said spacer block having a hole, said bolt shaft passing through said hole.

* * * * *

UNITED STATES PATENT AND TRADEMARK OFFICE
CERTIFICATE OF CORRECTION

PATENT NO. : 6,814,683 B2
DATED : November 9, 2004
INVENTOR(S) : Richard M. Krzesicki et al.

It is certified that error appears in the above-identified patent and that said Letters Patent is hereby corrected as shown below:

<u>Title page,</u>
Item [56], References Cited, OTHER DOCUMENTS, insert -- United States Patent Application Publication No. US 2002/0006845 published January 17, 2002, entitled "Differential Gears," to -- Okazaki --.

<u>Column 7,</u>
Line 62, "bead" should be -- head --.

Signed and Sealed this

Thirty-first Day of May, 2005

JON W. DUDAS
*Director of the United States Patent and Trademark Office*